United States Patent [19]

Miller

[11] 4,427,243
[45] Jan. 24, 1984

[54] DISPLAY STATION TILT MECHANISM

[75] Inventor: Robert J. Miller, Salford, Pa.

[73] Assignee: Decision Data Computer Corporation, Horsham, Pa.

[21] Appl. No.: 287,650

[22] Filed: Jul. 28, 1981

[51] Int. Cl.³ ............................................. A47B 81/06
[52] U.S. Cl. .................................... 312/7.2; 312/319; 358/254
[58] Field of Search .......................... 312/7.2, 7.1, 319; 358/254

[56] References Cited

U.S. PATENT DOCUMENTS

| | | | |
|---|---|---|---|
| 1,761,019 | 6/1930 | Marvel | 312/7.1 |
| 2,413,922 | 1/1947 | Jensen et al. | 312/7.2 |
| 2,589,627 | 3/1952 | Polley | 312/7.1 |
| 2,604,536 | 7/1952 | Rose | 312/7.2 |
| 2,805,411 | 9/1957 | Rose | 312/7.2 |
| 3,294,906 | 12/1966 | Swanson | 312/7.2 |
| 3,789,140 | 1/1974 | McQueen et al. | 358/254 |

Primary Examiner—Victor N. Sakran
Attorney, Agent, or Firm—Charles H. Lindrooth

[57] ABSTRACT

A tilt mechanism for tilting a cathode-ray tube viewing screen on which information is electronically displayed is disclosed. The screen is hingedly secured to a planar base for tilting from a vertical position in which it is substantially balanced through positions of progressively increased tilt in which the weight of the tube and associated parts becomes progressively displaced and the screen becomes more unbalanced. A camming bracket, pivotally mounted to the tube is spring urged into engagement with an abutment fixed relative to the base by a spring. The cam and the spring interact to counterbalance the viewing screen at all positions of tilt of the screen.

9 Claims, 6 Drawing Figures

DISPLAY STATION TILT MECHANISM

FIELD OF THE INVENTION

This invention relates to consoles having a screen on which video information is displayed and more particularly to a tilt mechanism for the screen of the console which renders the screen simply and quickly tiltable to a desired viewing position.

BACKGROUND OF THE INVENTION

Modern data processing work stations for communicating with a computer as part of a word processing or data processing system are typically equipped with a keyboard and cathode ray tube display at which an operator, when keying data views the work product as it is being entered on a screen which is typically the face of a cathode ray tube. As these stations become to be more extensively used, operator eye fatigue has become an increasing problem. Among the sources of this problem are glare on the face of the tube and an awkward or uncomfortable viewing angle arising because the position of the screen which is best for viewing will not be the same from operator to operator. Although the problem has been recognized, and tilt mechanisms have been employed to allow the operator to tilt the screen to a desired position, known solutions involve the use of a spring loaded catch which must be manipulated by the operator to set the screen angle at one of a plurality of finite locations.

SUMMARY AND OBJECTS OF THE INVENTION

In summary, and as a primary object, the invention involves the provision of a counterbalancing tilt mechanism which allows the operator to tilt the screen simply and quickly to any desirable tilt setting.

A related object of the invention is the provision of a simple mechanism which provides more comfortable viewing, reducing eye fatigue and improving efficiency at cathode ray tube work stations.

A still further object of the invention is the provision of a simple and effective counterbalancing tilt mechanism which operates at the touch of a hand.

A still further object of the invention is a simply manufactured and assembled counterbalancing tilt mechanism.

The foregoing, and other objects of the invention are achieved in a tilt mechanism for tilting a viewing screen on which information is displayed, which mechanism comprises hinge means for hinging the viewing screen to a base, a tilt bracket extending rearwardly from the viewing screen in a plane which is perpendicular to the hinge axis, means pivotally mounting the bracket to the screen so that the bracket is moveable relative to the face in said perpendicularly extending plane, said bracket having a camming surface extending perpendicularly to the base, a projection fixed relatively to the base and adapted to contact said camming surface and spring means for urging the camming surface and the projection into interengagement, said spring means providing a spring force which creates a frictional force which is equal and opposite to the gravitational forces acting to turn said screen about said hinge axis whereby the screen is held by the spring in any desired position of adjustment.

DETAILED DESCRIPTION OF THE ILLUSTRATIVE EMBODIMENT

Figure 1:
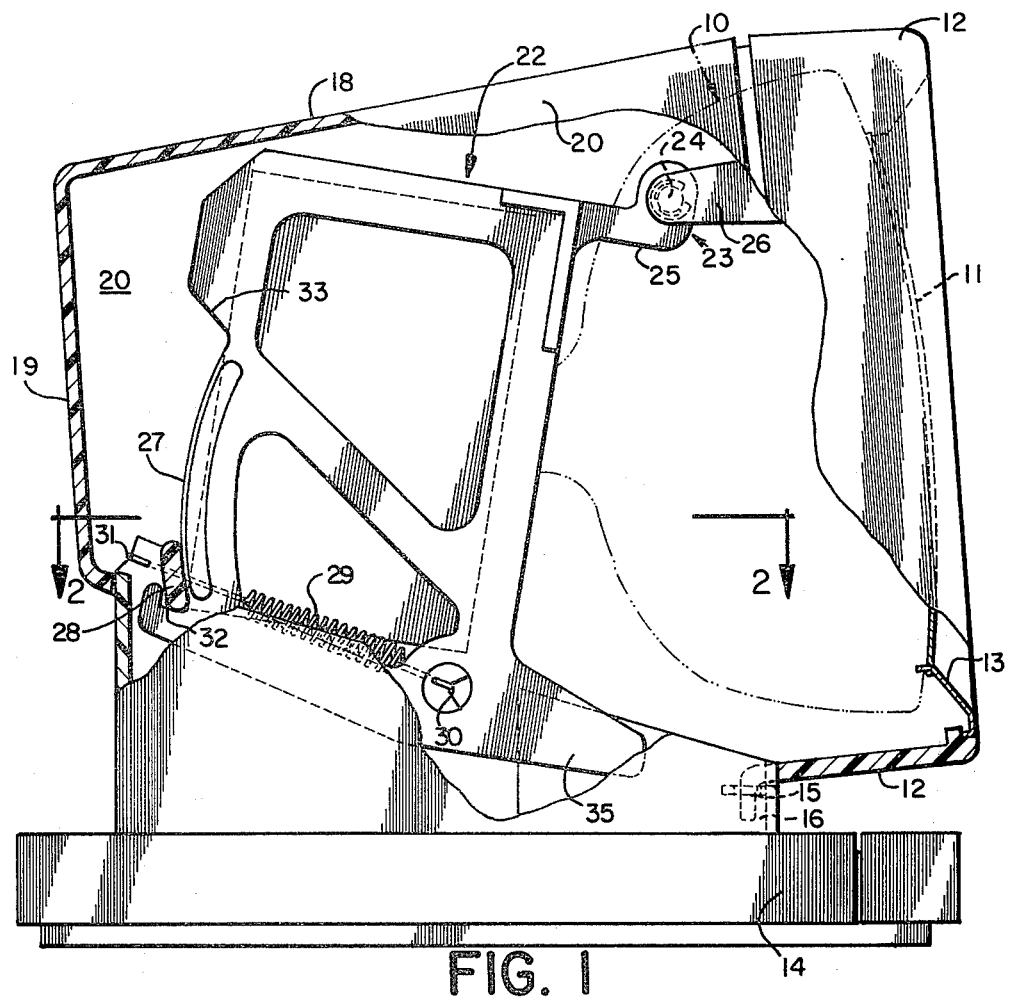
FIG. 1 is an elevational view with portions broken away for clarity of illustration, showing a cathode ray tube work station incorporating the principles of the invention.

Turning first to FIG. 1, the invention is illustrated as embodied in a cathode ray tube work station which includes a conventional cathode ray tube 10 having a face 11 on which information, typically keyed in from a keyboard, not shown, is displayed. In the illustrative embodiment the tube is carried in and supported by a substantially rectangular frame 12. A bezel 13 is mounted on the front of the frame 12 around the opening provided for the face of the tube and provides a border for the viewing surface 11.

Figure 3:
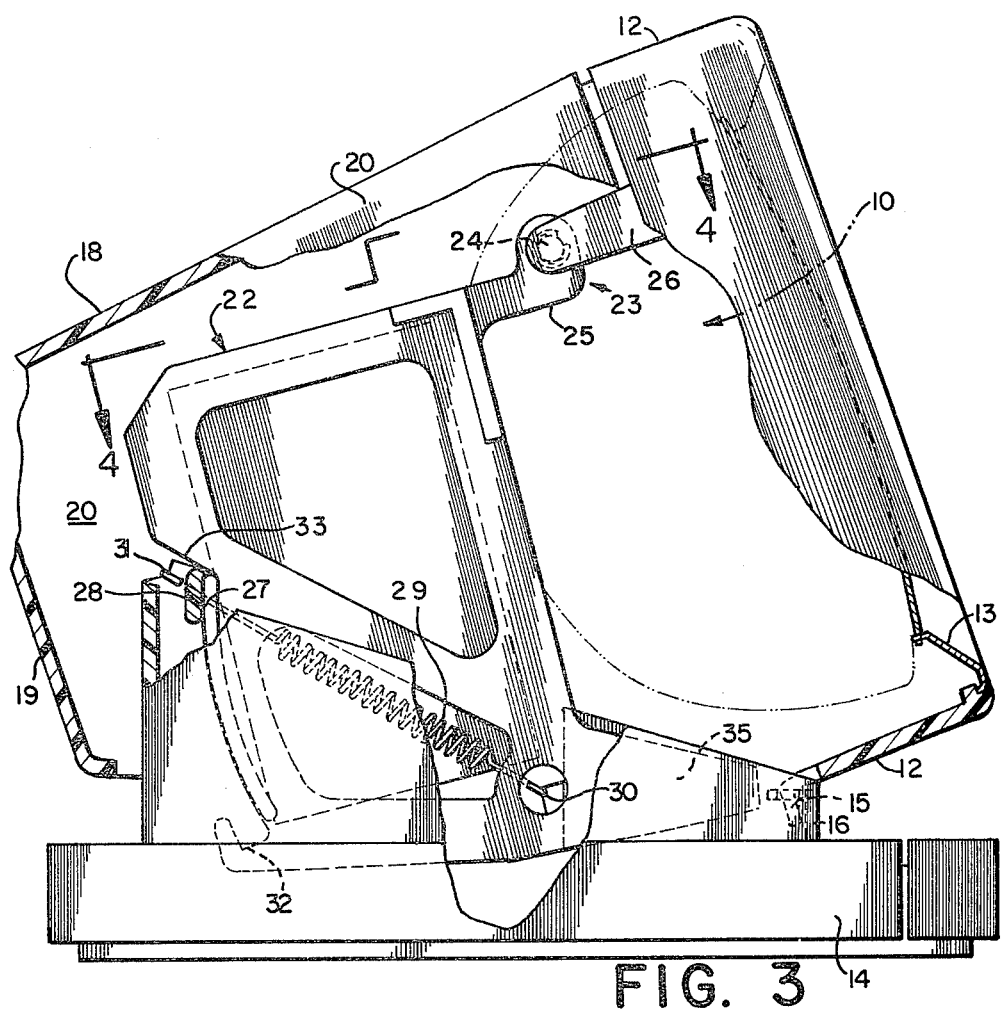
FIG. 3 is a view similar to FIG. 1, showing the screen at an extreme tilt position as compared with FIG. 1.
Figure 4:
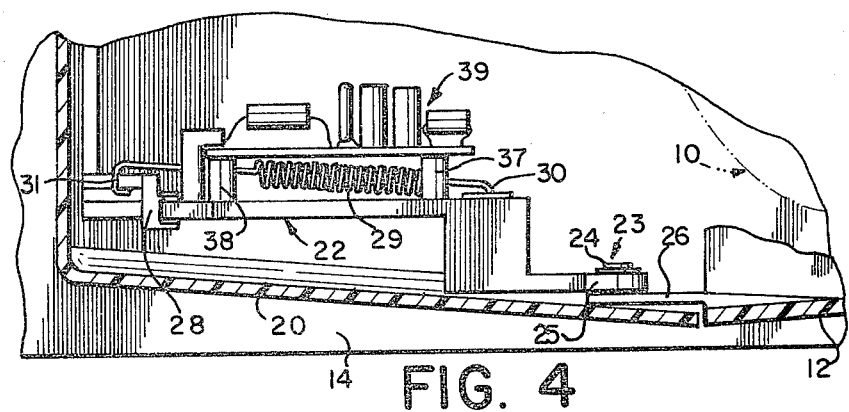
FIG. 4 is a sectional, fragmentary view taken along line 4—4 of FIG. 3.
Figure 5:
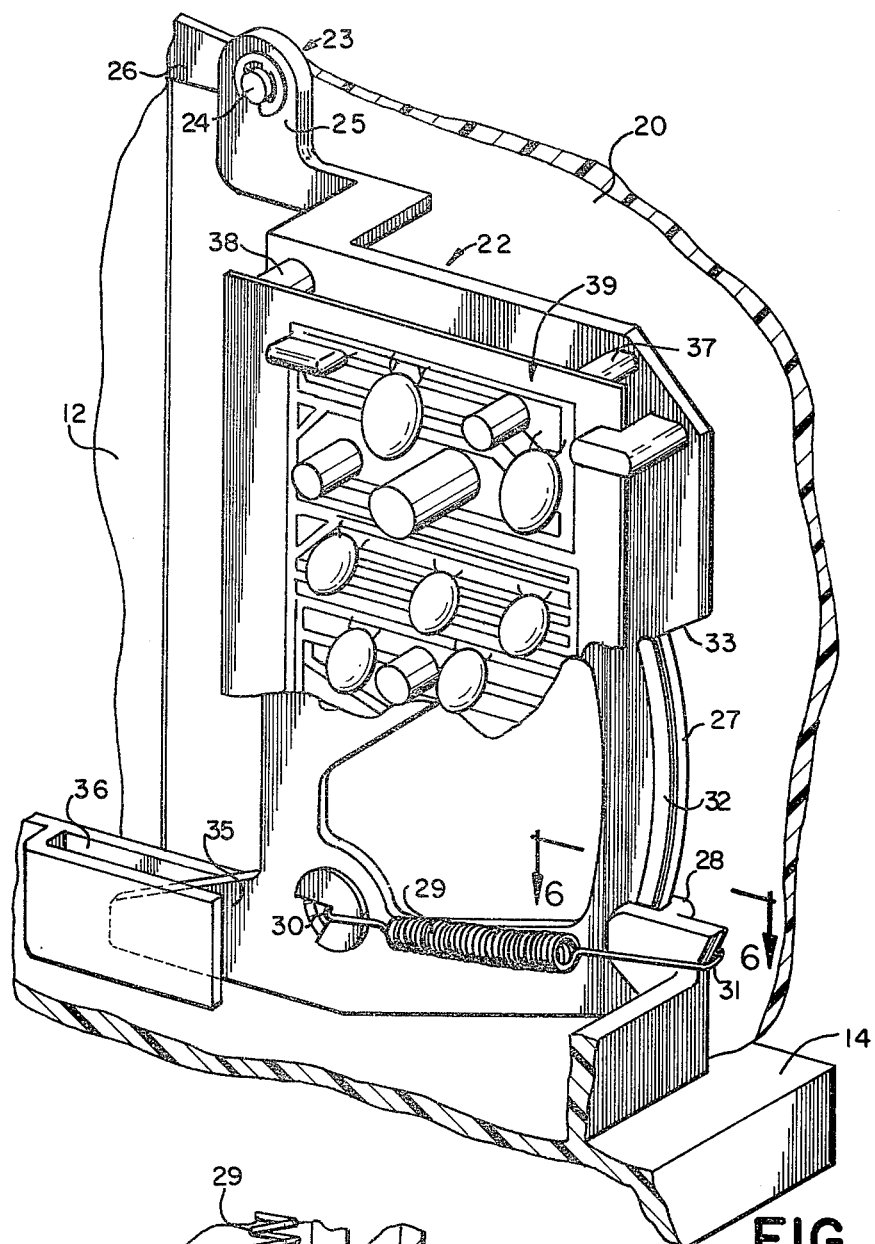
FIG. 5 is a perspective view of the bracket of FIGS. 1 through 4.

The apparatus is supported on a base 14. The lower part of frame 12 is provided with down turned projections 15 one of which is shown, which fit into slots in the base. The slot and down turned lips provide a hinge means so that the assembly comprising the tube 10 and frame 12 may be pivoted from a position in which the tube face is substantially vertical as shown in FIG. 1 to a position in which the tube face is tilted by an angle of about 20 degrees to the vertical, as shown in FIG. 3.

The housing for the tube is completed by an enclosure which is carried by frame 12 and which preferably comprises a top wall 18, rear wall 19 and side walls 20, all of which are preferably formed as a single unit formed of molded plastic, sheet metal or the like.

In order to control the tilt of the assembly comprising the tube, the frame and the enclosure carried by the frame, the invention comprises a counterbalancing cam means preferably comprising a bracket generally indicated at 22 which extends in a plane which is substantially perpendicular to the axis of the hinge means between the frame and the base. Bracket 22 is pivotally connected to frame 12 by pivot means 23 comprising a pivot pin 24 which interconnects a lug 25 on the bracket to a lug 26 affixed to frame 12. The pivot means 23 thus provides means for pivoting the bracket 22 relative to the frame 12 about an axis which is parallel to the hinge axis formed at 15 and 16.

In the illustrative embodiment of the invention, a cam having a surface 27 is formed on the rear of bracket 22. A projection 28 which is fixedly mounted with respect to base 14 is in contact with camming surface 27. The camming surface 27 is urged into engagement with projection or abutment 28 by spring means which preferably comprises a coil spring 29 one end of which is secured to the bracket as shown at 30 and the other end of which is secured to the frame as shown at 31.

Figure 6:
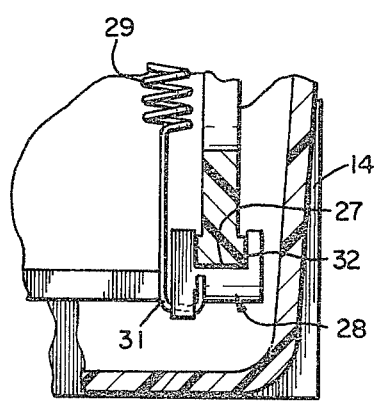
FIG. 6 is a fragmentary view taken along line 6—6 of FIG. 1 showing certain features of a preferred form of camming means of the invention.

A preferred form of projection for interengaging with the cam is shown in FIG. 6. As illustrated the preferred form of projection is formed with a U-shaped groove 32 in which camming surface 27 is guided.

It can be seen upon comparison of the relative positions of the parts in FIG. 1 and in FIG. 3 that the surfaces of projection 28 ride relatively upwardly from one limit of the curved surface 27 of the camming member to the other as the screen is tilted from the substantially vertical position to the maximum tilt position. Spring 29 elastically deforms and thereby urges the abutment and the camming member into interengagement with a force which varies from a minimum in the position in which the screen is nearest to vertical to a maximum force, produced by maximum extension of the spring, when the screen is tilted to the position of maximum tilt. At its position of minimum tilt the abutment 28 is stopped by an interengaging stop 32 at the lower end of bracket 22. A similar stop 33 engages the abutment when the screen reaches the maximum tilt position as can best be seen in FIG. 3.

Figure 2:
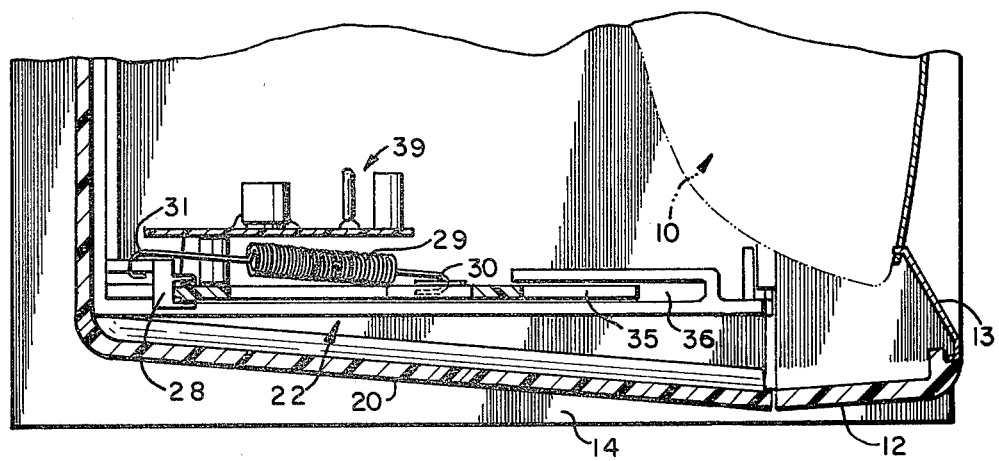
FIG. 2 is a fragmentary sectional view taken along line 2—2 of FIG. 1.

In order to guide the bracket and counteract any tendency for it to wobble the bracket is preferably formed with a forwardly extending projection 35 at the lower edge thereof adjacent to the point of connection 30 for spring 29. The projection 35 fits within a slot 36 best shown in FIG. 2 formed by a pair of parallel walls fixed to the base 14.

In the preferred embodiment of the invention tilt bracket 22 is provided with bosses 37 and 38 on which a printed circuit board 39 is mounted. Flexible connectors, not shown, connect terminals on printed circuit board 39 to corresponding terminals on the rear of tube 11.

In use, the spring loaded tilt bracket provides a counterbalancing force which varies from a minimum when the tube is in the nearly vertical position to a maximum when the tube is in the maximum tilt position. By appropriate selection of a spring having the proper spring constant, this force can be selected to exactly counterbalance the turning forces created by the weight of the cabinet so that the two counterbalance each other and hold the screen in any one of an infinite number of tilt positions selected by the operator. Since the two forces counteract one another, a very light touch is required by the operator to tilt the screen to the desired position. The need for spring loaded catches or locking means is eliminated and construction and assembly is simplified.

What is claimed is:

1. A tilt mechanism for counter balanced tilting of a viewing screen of a console on which information is electronically displayed, said console having a planar base, hinge means for hinging the viewing screen to the planar base for tilting the screen from a substantially vertical position in which the screen is substantially balanced through positions of progressively increased tilt at which the screen becomes progressively more unbalanced to a maximum tilt position, a tilt control bracket extending rearwardly from the viewing screen in a plane extending perpendicularly to the hinge axis, means pivotally mounting said bracket to the screen for pivotal movement of the bracket relative to the screen in said perpendicularly extending plane, said bracket having a camming surface located rearwardly of said pivotal mounting means in a plane perpendicular to the hinge axis, an abutment fixed relatively to the base extending into the plane and spring means elastically deformable upon movement of the screen towards the maximum tilt position for urging said camming surface into engagement with said abutment, the spring means being mounted to provide for minimum exertion of spring force when the screen is in a substantially vertical position and to provide gradually increasing spring force as the screen is moved toward a position of maximum tilt.

2. A tilt mechanism according to claim 1 wherein said spring is a coil spring fixed at one end relative to said abutment, the opposite end being connected to the tilt control bracket at a point offset from the pivotal mounting means, said point being located to provide continued extension of the spring as the screen is moved from minimum tilt position to maximum tilt position.

3. A mechanism according to claim 2 wherein said camming surface is curved.

4. A mechanism according to claim 2 wherein the console further includes an enclosure extending rearwardly from the screen, said enclosure being secured relative to the screen for tilting movement therewith for enclosing said tilt mechanism.

5. A counterbalanced tilt mechanism for the viewing screen of an information display console having a fixed base, said mechanism comprising means hingedly mounting the viewing screen about a horizontal hinge axis between a first limit position in which the screen is substantially vertical and a second limit position in which the screen is at a substantial tilt angle with respect to the vertical, said mechanism comprising a camming means including a first member pivotally mounted on the screen and extending rearwardly therefrom for movement about a pivot axis offset from and parallel to the hinge axis of the viewing screen and a second member fixed relative to the base of the console, said first and second members comprising a cam having a camming surface lying in a plane which is perpendicular to the hinge axis and an abutment and extensible spring means for maintaining said camming surface and said abutment in frictional interengagement as said viewing screen is moved to selected tilt positions between said first and said second limit positions, the spring means exerting a progressively increasing spring force as the screen is moved from the first limit position to the second limit position whereby the frictional forces between the cam and follower substantially counterbalance the gravitional forces acting to turn the screen about the hinge axis at all tilt positions of the screen.

6. A tilt mechanism according to claim 5 wherein said arcuate camming surface is provided on said first member and said abutment is fixed relative to said base.

7. A tilt mechanism according to claim 6 wherein said spring means comprising a coil spring for urging the camming surface and the abutment into interengagement, the spring having a spring constant producing a variable spring force which is substantially equal and opposite to the gravitational forces acting to turn the screen about the hinge axis.

8. A tilt mechanism according to claim 7 wherein said abutment includes a grooved face with parallel side walls engaging said camming surface whereby the frictional contact surface area between the cam and abutment is substantially enlarged.

9. A tilt mechanism according to claim 8 further including a guide slot in said base, the sides of said slot acting to guide the camming member for movement in a plane substantially perpendicular to the hinge axis.

* * * * *